(12) United States Patent
Ivan et al.

(10) Patent No.: US 7,497,954 B2
(45) Date of Patent: Mar. 3, 2009

(54) APPARATUS FOR SEPARATION OF WATER FROM OIL-BASED DRILLING FLUID AND ADVANCED WATER TREATMENT

(75) Inventors: Catalin Ivan, Houston, TX (US); Rahul Dixit, Houston, TX (US)

(73) Assignee: M-I L.L.C., Houston, TX (US)

( * ) Notice: Subject to any disclaimer, the term of this patent is extended or adjusted under 35 U.S.C. 154(b) by 548 days.

(21) Appl. No.: 11/348,940

(22) Filed: Feb. 7, 2006

(65) Prior Publication Data

US 2006/0186056 A1  Aug. 24, 2006

Related U.S. Application Data

(60) Provisional application No. 60/650,494, filed on Feb. 7, 2005.

(51) Int. Cl.
*C02F 1/24* (2006.01)
*C02F 1/54* (2006.01)
*C02F 9/02* (2006.01)

(52) U.S. Cl. ............... 210/703; 210/705; 210/708; 210/712; 210/725; 210/202; 210/205; 210/206; 210/221.2; 175/66; 175/206

(58) Field of Classification Search ........... 210/703, 210/705, 708, 712, 725, 202, 205, 206, 221.2; 175/66, 206

See application file for complete search history.

(56) References Cited

U.S. PATENT DOCUMENTS

| 3,473,665 | A | | 10/1969 | Duff | |
|---|---|---|---|---|---|
| 4,482,459 | A | * | 11/1984 | Shiver | 210/639 |
| 4,599,117 | A | | 7/1986 | Luxemburg | |
| 4,851,123 | A | * | 7/1989 | Mishra | 210/609 |
| 2003/0209499 | A1 | | 11/2003 | Haase | |
| 2004/0094483 | A1 | * | 5/2004 | Mueller | 210/708 |

OTHER PUBLICATIONS

International Search Report and Written Opinion for International Application No. PCT/US06/04283.

* cited by examiner

*Primary Examiner*—Thomas M Lithgow

(57) ABSTRACT

An apparatus for separating water from oil-based drilling fluid includes an separation tank, a chemical treatment apparatus having one or more de-oiling polymer preparation tanks, and a dissolved air flotation unit. Slop mud is directed into the separation tank where surfactant is added to separate the drilling fluid from oily water. The drilling fluid is drained for further processing. The oily water is removed by an outlet arrangement from the separation tank and directed to an initial treatment line. One or more de-oiling polymers are added to the oily water in the initial treatment line and mixed therewith. The mixture may then be directed to the dissolved air flotation unit where dissolved air is released into the bottom of the mixture. The dissolved air adheres to suspended solids in the mixture and lifts them to the top surface as a froth. The froth is skimmed from the top surface of the mixture and collected. The de-frothed water is reused or directed to a filtration system where it is prepared for discharge. A clarifying tank may be included after the de-oiling polymers are added to further separate the oil and water. The oil is removed from the top surface by a weir while the water is directed to the filtration system and discharged.

20 Claims, 3 Drawing Sheets

APPARATUS FOR SEPARATION OF WATER FROM OIL-BASED DRILLING FLUID AND ADVANCED WATER TREATMENT

This application claims priority to U.S. Provisional Patent Application Ser. No. 60/650,494 filed on Feb. 7, 2005 entitled, "Apparatus for separation of water from oil-based drilling fluid and advanced water treatment" incorporated herein by reference for all purposes.

BACKGROUND OF INVENTION

As a result of rigorous environmental regulations shifting towards zero-discharge, drilling wastes are the focus of attention in the oil and gas exploration industry. Drilling with oil-base mud (OBM) or synthetic-base mud (SBM) generates waste streams often referred to as "slop mud" or "slop water." "Slop water" or "slop mud" are among the significant waste streams from exploration and development activities. Slop water or slop mud is a waste stream which is produced when an oil/synthetic/diesel-based drilling fluid becomes contaminated with water. These waste streams are byproducts of cleaning the drill floor, shaker room, pump room and other areas where spillage and interfaces during displacement occur. Contamination can also take place during boat cleaning operations, pit cleaning and other similar operations.

After contamination, the drilling fluid may contain 50 to 90% loosely emulsified water and 10 to 50% non-aqueous drilling fluid. This affects the properties of the drilling fluid by lowering the oil-water ratio (OWR), increasing viscosity, decreasing emulsion stability and ultimately forming an unusable drilling fluid. Hydrocarbon contamination renders these slops ineligible for overboard discharge. This unusable mud is typically sent for disposal or reconditioning. For operators, these volumes add up to enormous disposal expenses and represent a potentially expensive environmental issue.

In addition to good fluid design and solids-control equipment to help reduce the amount of waste generated, current separation processes exist to treat slop water/mud waste streams by breaking the weakly emulsified water phase and recovering the OBM/SBM so that mud can be reused without incurring the cost of expensive reconditioning and at the same time reduce the amount of waste generated. Currently, these slop wastes are pumped into treatment tanks where appropriate chemicals (demulsifiers) are added to separate the water from the drilling fluid. The demulsifier treatment concentration ranges from 2 to 4% by volume. The primary goal of this form of slop separation is to break only the weakly emulsified water phase and recover the oil/synthetic/diesel-based drilling fluid. The objective is to leave the OBM/SBM intact, so the mud can be reused with minimal reconditioning. The separation process lasts from 8 to 24 hours.

Once separation has occurred, the separated constituents (drilling fluid and water) are transferred to separate holding/treatment vessels. The recovered water is treated (flocculation and filtration) to local charge standards, if possible. If it cannot be discharged, it must be reused.

It would be an improvement to the art to have a system that includes a chemical technology that decreases the time required for phase separation and increases the quantity of water recovered. It would be a further improvement to the art to treat slop mud and clean/polish recovered water to make it dischargeable without further treatment. A shorter separation time could radically increase the quantity of slop processed. Increase in the phase separation efficiency would improve the drilling fluid OWR. Reducing the concentration of the water-soluble surfactant consumed would likewise reduce the organics in the recovered water and ease the downstream polishing of the water to meet discharge criteria. Too much shear can cause the separated water to re-emulsify back into the slop. A more effective surfactant/mixing technology would reduce the likelihood of re-emulsification. Current water treatment practices necessitate frequent changing of filter cartridges, which is expensive, labor intensive and time consuming.

SUMMARY

The proposed apparatus is designed to treat slop mud/slop water and clean/polish the recovered water to make it dischargeable. It includes a chemical technology which decreases the time required for phase separation and increases the quantity of water recovered. The proposed apparatus has a unique design which maximizes the efficient removal of the recovered water after phase separation has occurred thereby increasing the oil-to-water ratio (OWR) of the recovered mud and reduce the solids loading in the recovered water. The apparatus includes techniques/equipments in addition to bag filters to clean/polish the recovered water so as to increase the life-span of the filter bags, reduce frequent disposal of filter bags and meet stringent environmental regulations which would not be possible with the current separation processes.

In one aspect, the claimed subject matter is generally directed to an apparatus for separating water from an oil-based drilling fluid. The apparatus includes an separation tank, a chemical treatment apparatus having at least one de-oiling polymer preparation tank, and a dissolved air flotation unit. The water and oil-based drilling fluid, or slop, is directed into the separation tank. A surfactant is added to the slop mud from a bottom portion of the separation tank to separate the water and the oil-based drilling mud. The drilling fluid is drained through the bottom of the tank and collected for further processing. The oily water is drained through an outlet arrangement of valves vertically attached along a side of the tank.

Non-slop water is added to the drained water and the mixture is pumped through an initial water treatment line. De-oiling polymers are prepared in individual tanks and directed into the initial treatment line where they are mixed with the oily water. The treated water mixture finally is directed into the dissolved air flotation unit. Dissolved air is released from the bottom of the separation tank of the dissolved air flotation unit and adheres to suspended solids in the fluid mixture, forming a froth along the top of the separation tank. The froth is skimmed from the top and collected in a separate tank. The water is directed from the dissolved air flotation unit to be reused or may be further treated for discharge.

A clarifying tank may be selectively included after the addition of de-oiling polymers and before the dissolved air flotation unit. In the clarifying tank, solids may accumulate at the bottom of the tank and be discharged to a collection area. A weir may be used to remove oil from the top of the water. The water within the clarifying tank may be directed to the dissolved air flotation unit.

In another aspect of the claimed subject matter, a method for separating water and oil-based drilling mud includes adding surfactant to the slop mud and collecting the mud from a separation tank. After releasing the oily water from the agitator tank, the method includes adding de-oiling polymers to the oily water and mixing the respective polymer with the oily water. The method next includes adding air to the oily water mixture to push froth to the top and skimming the froth from the top of the water. The water may then be reused or further treated before discharging. The method may include removing solids from the oily water and removing a layer of oil from the water with a weir before directing the water to the dissolved air flotation unit. The water from the dissolved air flotation unit may be filtered to prepare the water for discharge.

Other aspects and advantages of the claimed subject matter will be apparent from the following description and the appended claims.

DETAILED DESCRIPTION

Figure 1A:
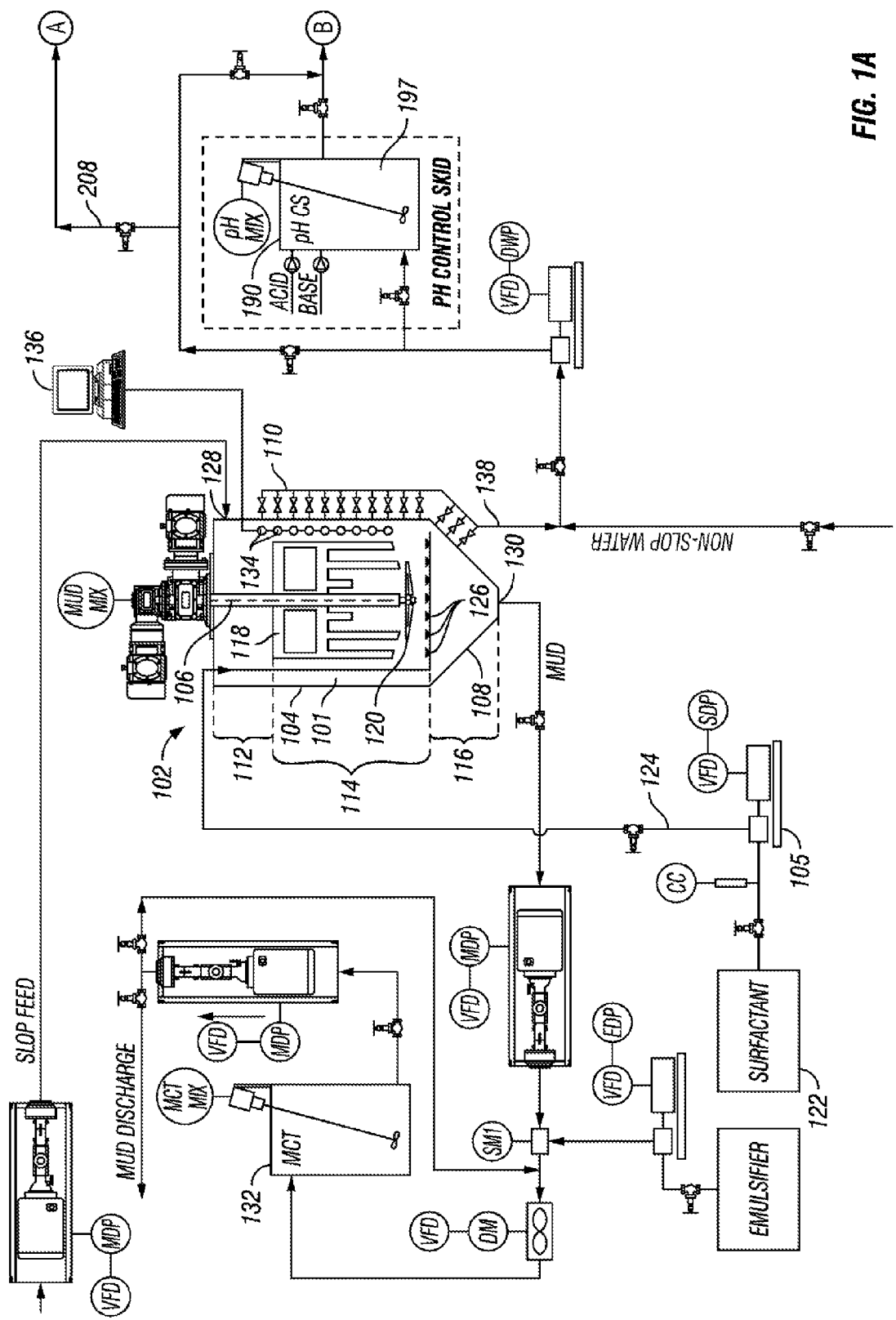
FIG. 1 is a schematic of the apparatus for separation of water from oil-based drilling fluid.

In one aspect, embodiments disclosed herein are directed to an apparatus 100 and method for removing water from an oil-based drilling fluid. In another aspect, embodiments disclosed herein are directed to a system and method for treating the water for further use or for discharge. In one embodiment, an apparatus 100 includes an separation module 102 and a water treatment module 103.

Separation Module

In one embodiment, the separation module 102 separates the slop into mud and water and recovers the non-aqueous drilling fluid. In this embodiment, the separation module includes a separation tank 101. In one embodiment the separation tank 101 is a vertical tank defined by a tank wall 104 having a floor 108 at the lower edge of the tank wall 104. The floor 108 is shaped to urge material towards an outlet 130 through floor 108. In one embodiment of the invention, a water outlet arrangement 110 includes a series of valves along a length of the tank wall 104. In one embodiment, the outlet arrangement 110 may extend along a portion of the floor 108 as well. In general, the separation tank 102 may be thought of as having a top segment 112 located above the uppermost valve 110 in the tank wall 104, a bottom segment 116 located below the intersection of the floor 108 and the tank wall 104 and a middle segment 114 between the top and bottom segments 112, 116.

A rake apparatus 118 is rotationally retained in the middle segment 114 of the tank 102. A distribution apparatus 120 is rotationally retained below the rake apparatus 118. In one embodiment, the rake apparatus 118 and the distribution apparatus 120, while rotational about a common axis 106, rotate independently of one another. In this embodiment, the speed with which the rake apparatus 118 and the distribution apparatus 120 each rotate are also independent of one another and may be variable for each. In one embodiment, the distribution apparatus 120 comprises blades rotatable about axis 106.

In one embodiment, the slop is pumped into the separation tank 101. Slop is fed into the top segment 112 of the separation tank 102 through a slop inlet 128 in the tank wall 104. In this embodiment, surfactant is injected into the separation tank 101. In one embodiment, a dosing pump 105 is used to add demulsifying surfactant into the separation tank 101 via injection ports 126 around the tank wall 104. This allows the homogeneous dispersion of the surfactant into the slop mud.

When surfactant is injected into the separation tank 101, the distribution apparatus 120 is rotated periodically for an amount of time sufficient to distribute the surfactant in the slop. The amount of time in which the distribution apparatus 120 rotates is that which is sufficient to distribute the surfactant and separate the mud and water without causing a phase change of the surfactant and slop mixture. In one embodiment, the surfactant is mixed into the slop for two minutes to allow for separation and then left to gravity settle over an appropriate period of time. In one embodiment this is approximately fifteen minutes or less depending upon the surfactant used. The rake apparatus 118 can be applied at this stage to enhance the water recovery. The surfactant causes the mud and water to separate, with the heavier component, the mud, settling to the bottom of the separation tank 101, where it may be removed through the outlet 130. In one embodiment, the mud released through the outlet 130 in the tank floor 108 is directed to a collection area 132 for further processing.

After settling and raking, the oily water, having a lower specific gravity than the mud, rises to the top of the mud. The oily water is then ready to be removed from the separation tank 101 through the outlet arrangement 110 located on the side of the tank 101.

Before the oily water can be removed, the interface between the mud and the oily water must be determined. In one embodiment, this interface is determined by a ball float. The ball sinks through the water phase and floats on the surface of the recovered mud below. The level of the interface is determined electronically and displayed on a multi-view screen as inches of fluid from the floor 108. In another embodiment, the interface is located by manually taking samples at various vertical locations within the tank 102. In yet another embodiment, the interface is located using sensors located vertically along the tank wall 104. In this embodiment, the sensors provide information to a workstation 136 or controller regarding the composition of the fluid at each sensor location. Based on the fluid composition at various heights within the separation tank 102, one or more valves 110 are opened to release the oily water into an oily water release line 138. In one embodiment the valves of the outlet arrangement 110 are opened manually. In another embodiment, the valves of the outlet arrangement are opened and closed by a programmable logic controller or similar controller.

Water Treatment Module

Water that is removed from the Separation Module is not suitable for discharge and must undergo further treatment. This treatment is provided by the Water Treatment Module 103. In one embodiment, the Water Treatment Module 103 comprises a chemical treatment unit 142, a dissolved air flotation unit 158, and a filtration unit 206. In one embodiment, the Water Treatment Module 103 further includes a clarifier unit 192. In one embodiment, the Water Treatment Module includes a pH-control unit 190.

Clarifier Unit

In the clarifier unit 192, the separated water flows through a coalescing tank 193 and is directed through baffles 195 with hundreds of square feet of lipophilic coalescing media. Mechanically emulsified oil particles rise from the water to the lipophilic media, and float to the surface. A weir arrangement 200 in the coalescing tank 193 drains oil floating on the top surface of the water. The skimmed oil is collected for disposal or treatment. In one embodiment, water overflowing the weir arrangement 200 is collected with skimmed oil in an oil/water separator 204. In one embodiment, water separated in the oil/water separator 204 is recirculated to the coalescing tank 193.

Fine silt and particulates from the wastewater stream settle at the base of the coalescing tank 193. Solids that settle to the bottom of the coalescing tank 193 are released to a bag filter 196. In one embodiment the solids are discharged and any fluid filtered out is directed through a recirculation line 198 to be recirculated through the clarifying tank 192.

pH-Control Unit

In one embodiment the water form the clarifier unit 192 is fed directly into a pH-control unit 190 for adjusting the pH prior to chemical treatment. In one embodiment, the pH of the water is measured by a pH probe in a tank 197 and a PID controller actuates pumps to inject acid or caustic until the desired pH range is achieved. In one embodiment water is selectively directed into the tank 197 when an upstream pH probe measures the pH to be out of the desired range.

In one embodiment, the desired pH range is about 6.0 to about 9.0. It is appreciated by those of skill in the art a pH probe can have a tolerance as to its accuracy. It is appreciated by those of skill in the art that the desired pH range depends on the chemical treatment to be applied to the water and the desired range may be adjusted accordingly.

Chemical Treatment Unit

The treated water from the pH-control unit 190 is directed to a water treatment line 140. In one embodiment, one or more de-oiling polymers from the de-oiling polymer preparation tanks 142 are directed through respective feed lines into the water treatment line 140. In one embodiment, the treated water is injected inline with a coagulant and a flocculant. The chemical treatment of the water removes the smaller droplets of oil and solids that the coalescing tank 193 could not remove. These smaller particles need to be coalesced or agglomerated into larger particles before they can be effectively removed from the water. Agglomeration and/or coalescence of the droplets are dependent on their surface charge density, the physio-chemical properties of the interfacial film surrounding the droplets, and the composition of the aqueous phase. The first two features may be modified using coagulants and flocculants. The small oil droplets in the recovered water are stabilized by native surface-active species, which typically result in a negative surface charge on the oil droplets. The addition of either organic or inorganic coagulants may be used to neutralize this stabilizing charge, thereby allowing the droplets to come into close contact and promoting aggregation and coalescence. Additionally, high-molecular-weight polyelectrolytes may be used to flocculate the oil droplets. Thus, even if the oil droplets do not coalesce, they are sufficiently aggregated to improve their separation from the aqueous phase in subsequent separation techniques, in one embodiment using, dissolved air flotation.

The type of treatment, order of addition, and timing the sequence of additions will vary with the specific batch of separated water and type of surfactant previously used. A small laboratory-scale test should be carried out on the sample of the separated water to determine the optimum treatment.

In one embodiment, a coagulant from a coagulant tank 144 is directed through a coagulant feed line 146 into the initial water treatment line 140. In one embodiment, a first static mixer 148, is located along the water treatment line 140 to mix the oily water and coagulant. In one embodiment, a flocculant from a flocculant tank 150 is directed through a flocculant feed line 152 to the water treatment line 140. In one embodiment, a second static mixer 154 is located along the water treatment line 140 to mix the water and flocculant.

The chemically treated water is pumped into an aging tank 160 where the residence time allows the formation of flocs to take place.

Dissolved Air Flotation Unit

The water from the aging tank 160 is fed under gravity to the dissolved air flotation unit 158 to prevent the flocs from being destroyed during transit. The fluid mixture is fed from the aging tank 160 to the dissolved air flotation unit 158 at a predetermined rate based on the size of the dissolved air flotation unit 158 and the chemical characteristics of the fluid mixture.

Dissolved air flotation is the process of removing the suspended solids, oil and other contaminants via air bubble flotation. The process involves dissolving air into water under pressure. When this air/water mixture is injected into the waste stream, the pressure is released and the air comes out of solution, producing bubbles, which attach themselves to contaminant material in the waste water. This increases the buoyancy of the contaminated material and floats it to the water surface.

Figure 1B:
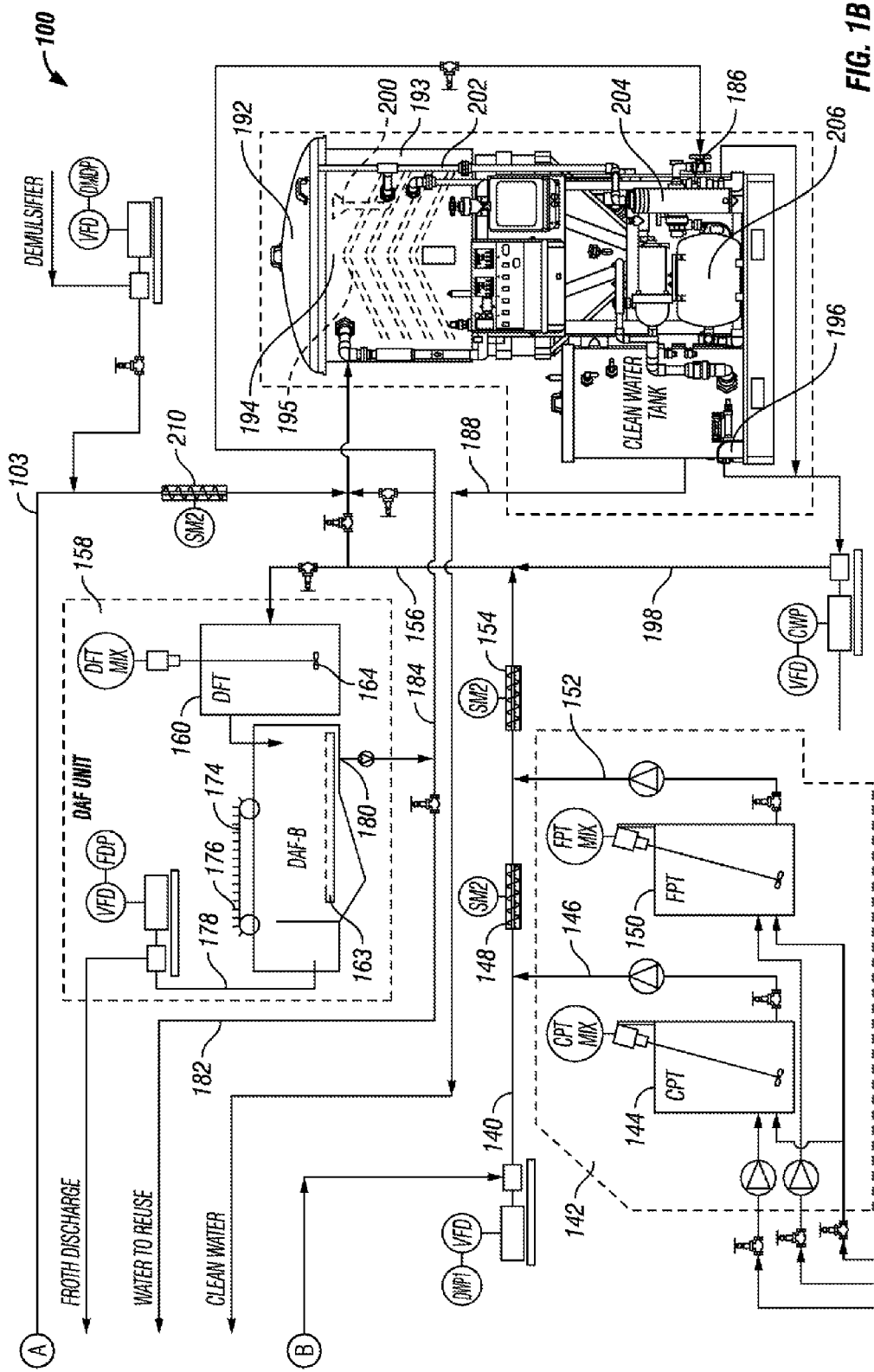
Figure 2:
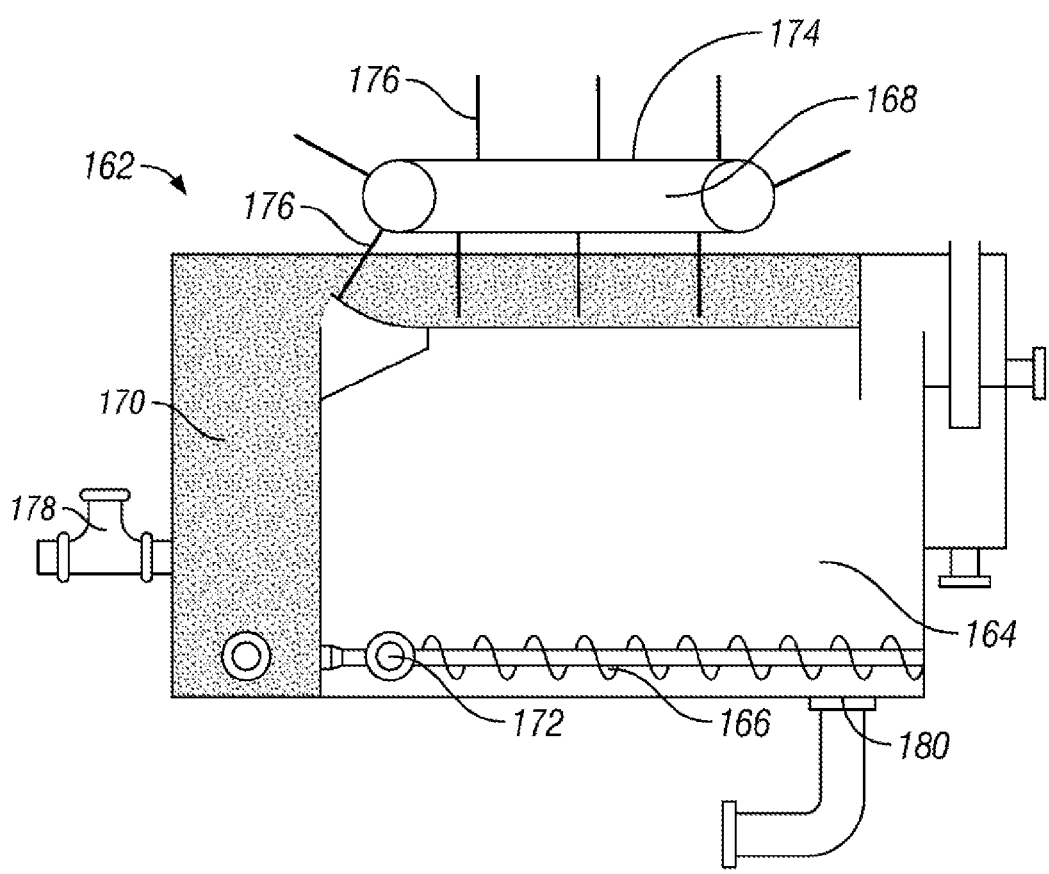
FIG. 2 is a schematic of the separator unit of a dissolved air flotation unit.

The dissolved air flotation unit 158, shown in more detail in FIG. 2, includes a main tank 164, an auger 166, a skimmer 168, and a froth tank 170. The fluid mixture is introduced into the main tank 164 from the aging tank 160. Any remaining solids settle to the bottom of the main tank 164 and may be directed to a solids discharge 172 by the auger 166. Air is dissolved into water and released from the bottom of the main tank 164 by a dissolved air introduction apparatus 163 (shown schematically in FIG. 1). As previously described, the air bubbles attach to suspended solids, increasing their buoyancy and causing them to float to the top of the fluid mixture in the main tank 164. In one embodiment, the skimmer 168, located over the top of the main tank 164, has a belt 174 with paddles 176 that extend into a top portion of the main tank 164. As the belt 174 moves, the paddles 176 in the main tank 164 travel toward the back of the main tank 164. The buoyant solids, or froth, are pushed by the paddles 176 to the froth tank 170. The froth collected in the froth tank 170 is collected and discharged through a froth discharge line 178. The water within the main tank 164 is directed through a water outlet 180. Referring again to FIG. 1, in one embodiment, water from the water outlet 180 is directed through a water reuse line 182 to be reused in other processes. In one embodiment, the water from water outlet 178 may be directed through a filter line 184 to a filtration unit 186 where the water is further treated before discharge through clean water line 188.

Filtration Unit

In one embodiment, the filtration unit 186 includes a multimedia filter that contains a special media blend to filter out particles larger than 25 microns. In one embodiment a second and third filter are an organo-clay filter and activated carbon filters to remove both free oil and dissolved hydrocarbons.

Method

In one embodiment, a method for separating water from an oil-based drilling mud includes directing the slop to a separation tank 101 through a slop inlet 128 and injecting surfactant to the slop. The surfactant makes the drilling fluid and the water separate. In a surfactant distributing step, a distributing apparatus 120 rotates intermittently to disperse the surfactant within the slop to aid in the separation of drilling fluid and water. In a separation maintaining step, a rake apparatus rotates to maintain the separation between the water and the drilling fluid. The drilling fluid is heavier than the water, so the mud settles to the bottom of the separation tank 101 and is removed via an outlet 130 in the tank floor 108.

In one embodiment, the method includes determining a separation point between the water and the drilling fluid. In one embodiment this is done by manually testing fluid at locations at various vertical points in the separation tank 101. In another embodiment, the separation location is determined automatically by using sensors to sense one or more distinguishing characteristics between the water and the drilling fluid. In another embodiment, the separation location is determined by a ball float that sinks through the water layer and floats on the top of the layer of mud. The water is discharged through an outlet arrangement vertically located along a section of the separation tank 101.

In one embodiment of the method, the oily water is directed to a coalescing tank 193. In this embodiment, the water and oil are further separated by coalescing plates. Settled solids are removed by a solids filter bag 196. In one embodiment fluid filtered from the solids bag filter 196 is recirculated to the coalescing tank 193. In one embodiment, oil and some water from the top portion of the coalescing tank is directed by a weir 200 to an oil/water separator 204. Water from the oil/water separator 204 is recirculated to the coalescing tank 193.

In one embodiment, the method includes directing the oily water from the coalescing tank 193 to a pH-control unit 190. In this embodiment, the pH is measured and corrected if needed, to be within a desired range. In one embodiment, the pH of the oily water is measured prior to reaching the adjustment tank and the water is directed around the pH control unit 190 if the measured pH is in the desired range.

In one embodiment, a coagulant and a flocculent are added to the oily water to remove small droplets of oil and solids. In one embodiment the water mixture is directed to an aging tank to allow the formation of flocs.

In one embodiment the water mixture is gravity fed to a dissolved air flotation unit 158. In this embodiment, dissolved air is released into a separating tank 162. The air bubbles and the suspended solids in the mixture adhere and rise to the top of the separating tank 162, forming a froth. The froth is removed from the remaining water and collected in a froth tank 170. In one embodiment, the remaining water is discharged for reuse. In another embodiment, the water is directed to a filtration system 186 where it is filtered and discharged as clean water.

In one embodiment a demulsifier is added to the oily water from the separation tank 102. After mixing the demulsifier and the oily water, the mixture is directed into the clarifying tank 192.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. An apparatus for removing and treating water in an oil-based drilling mud comprising:
   a separation tank receiving slop, wherein the separation tank comprises:
   a surfactant inlet through which a surfactant is selectively introduced into the separation tank to separate oily water from the oil-based drilling mud;
   a distribution apparatus for distributing the surfactant in the slop mud;
   a rake apparatus to facilitate and maintain separation of the oily water and the oil-based drilling mud;
   a water outlet arrangement for selectively removing separated oily water from the separation tank;
   a water treatment line in fluid communication with the water outlet;
   a chemical treatment unit in fluid communication with the water treatment line for providing de-oiling polymers to the oily water in the water treatment line, wherein the de-oiling polymers adhere to oil in the oily water to form solid particulates;
   a dissolved air flotation unit in fluid communication with the water treatment line for receiving chemically treated water and for removing the solid particulates from the water by introducing dissolved air to the treated water, wherein the dissolved air flotation unit includes a treated water outlet for selectively removing treated water therefrom.

2. The apparatus of claim 1, further comprising:
   a static mixer located along the water treatment line for commingling the de-oiling polymers and the oily water in the water treatment line.

3. The apparatus of claim 2, further comprising:
   a pH-control unit in fluid communication with the separation tank and the water treatment line for adjusting the pH of the oily water to a predetermined range.

4. The apparatus of claim 3, further comprising:
   a coalescing tank in fluid communication with the separating tank comprising:
   coalescing baffles for separating oil and water;
   a solids discharge for selectively removing settled solids from the coalescing tank;
   a weir arrangement for skimming oil from the water;
   a water outlet for selectively removing water from the coalesing tank to the water treatment line.

5. The apparatus of claim 4, further comprising:
   an oil/water separator in fluid communication with the weir arrangement of the coalescing tank, wherein the oil/water separator comprises:
   a water outlet selectively in fluid communication with the coalescing tank.

6. The apparatus of claim 5 wherein the chemical treatment unit comprises:
   a coagulant tank having a coagulant outlet in fluid communication with the water treatment line for selectively providing coagulant to the oily water in the water treatment line;
   a static mixer along the water treatment line to commingle the coagulant in the oily water;
   a flocculant tank having a flocculant outlet in fluid communication with the oily water treatment line for selectively providing flocculant to the commingled coagulant and water in the water treatment line.

7. The apparatus of claim 6, wherein the separation tank comprises:
   a sensor apparatus for detecting a location of separation between oily water and drilling mud and transmitting a signal indicative of the location of separation;
   wherein the water outlet arrangement includes a plurality of water outlets in fluid communication with the water treatment line;
   a control apparatus for receiving the signal from the sensor apparatus and selectively opening at least one water outlet to remove the oily water from the separation tank to the water treatment line.

8. An apparatus for separating and treating water from an oil-based drilling mud comprising:
   a separation tank receiving slop, wherein the separation tank comprises:
   a surfactant inlet through which a surfactant is selectively introduced into the separation tank to separate oily water from the oil-based drilling mud;
   a distribution apparatus for distributing the surfactant in the slop mud;
   a rake apparatus to facilitate and maintain separation of oily water and the oil-based drilling mud;

a water outlet arrangement for selectively removing separated oily water from the separation tank, wherein the water outlet arrangement includes a plurality of valves;

a sensor apparatus for detecting a location of separation between the oily water and drilling mud and transmitting a signal indicative of the location of separation;

a control apparatus for receiving the signal from the sensor apparatus and selectively opening at least one water outlet to remove water from the separation tank;

a water treatment line in fluid communication with the water outlet apparatus;

a chemical treatment apparatus in fluid communication with the water treatment line for providing de-oiling polymers to the oily water in the water treatment line, wherein the de-oiling polymers adhere to oil in the water to form solid particulates;

an aging tank receiving the chemically treated water and preventing damage to flocs formed in the treated water;

a dissolved air flotation unit in fluid communication with the water treatment line for receiving chemically treated water and for removing the solid particulates from the water, wherein the dissolved air flotation unit comprises:

a separator unit receiving the flocs and water from the aging tank;

a solids discharge for removing settled solids from the separator unit;

a dissolved air introduction apparatus for introducing dissolved air to the water and flocs in the separator unit;

a skimmer for removing flocs from a top surface of the chemically treated water;

a froth tank receiving and collecting skimmed flocs from the skimmer;

a treated water outlet for selectively removing treated water from the separator unit.

9. The apparatus of claim 8, further comprising:
a pH control unit in fluid communication with the separation tank and the water treatment line for adjusting the pH of the oily water to a predetermined range.

10. The apparatus of claim 9 further comprising:
a static mixer located along the water treatment line for commingling the de-oiling polymers and the oily water in the water treatment line.

11. The apparatus of claim 10 further comprising:
a coalescing tank in fluid communication with the separating tank comprising:
coalescing plates for separating oil and water;
a solids discharge for selectively removing settled solids from that coalescing tank;
a weir arrangement for skimming oil from the water;
a water outlet for selectively removing water from the discharge tank to the water treatment line.

12. The apparatus of claim 11 further comprising:
an oil/water separator in fluid communication with the weir arrangement of the coalescing tank, wherein the oil/water separator comprises:
a water outlet selectively in fluid communication with the coalescing tank.

13. The apparatus of claim 12 wherein the chemical treatment apparatus comprises:

a coagulant tank having a coagulant outlet in fluid communication with the water treatment line for selectively providing coagulant to the oily water in the water treatment line;

a static mixer along the water treatment line to commingle the coagulant in the oily water;

a flocculant tank having a flocculant outlet in fluid communication with the water treatment line for selectively providing flocculant to the commingled coagulant and oily water in the water treatment line.

14. An method for separating and treating water in an oil-based drilling mud comprising:
directing slop to a separation tank;
adding surfactant to the separation tank;
distributing the surfactant through the slop mud to separate oily water and drilling mud by selectively rotating a set of distributing blades located within the separation tank;
maintaining the separation of oily water and drilling mud by selectively rotating a rake apparatus within the separation tank;
sensing a separation layer between the oily water and the drilling mud with a sensor apparatus;
removing the oily water from the separation tank through a water outlet arrangement on the separation tank;
adding de-oiling polymers to the oily water in a water treatment line;
mixing the de-oiling polymers with the oily water so that the de-oiling polymers react with oil in the oily water to form solids particulates;
releasing dissolved air into the water and solid particulate mixture to cause the solid particulates to form a froth on a top surface of the water;
skimming the froth from the top surface of the water;
discharging the water.

15. The method of claim 14, further comprising:
adjusting the pH of the oily water removed from the separation tank to a predetermined range.

16. The method of claim 15, wherein the dissolved air is released into the water and solid particulate mixture in a dissolved air flotation unit.

17. The method of claim 16, further comprising:
separating water and oil in a coalescing tank by directing the water and solid particulate mixture over coalescing plates in the coalescing tank;
removing an oil component from the separated water from the coalescing tank to an oil/water separator;
directing water from the coalescing tank to the dissolved air flotation unit for further separation.

18. The method of claim 17, further comprising:
further separating oil and water in the oil/water separator;
selectively recirculating the separated water to the coalescing tank.

19. The method of claim 18, further comprising:
filtering the water discharged from the dissolved air flotation unit;
releasing the filtered water.

20. The method of claim 18 further comprising:
reusing the water discharged from the dissolved air flotation unit.

* * * * *